2,777,003

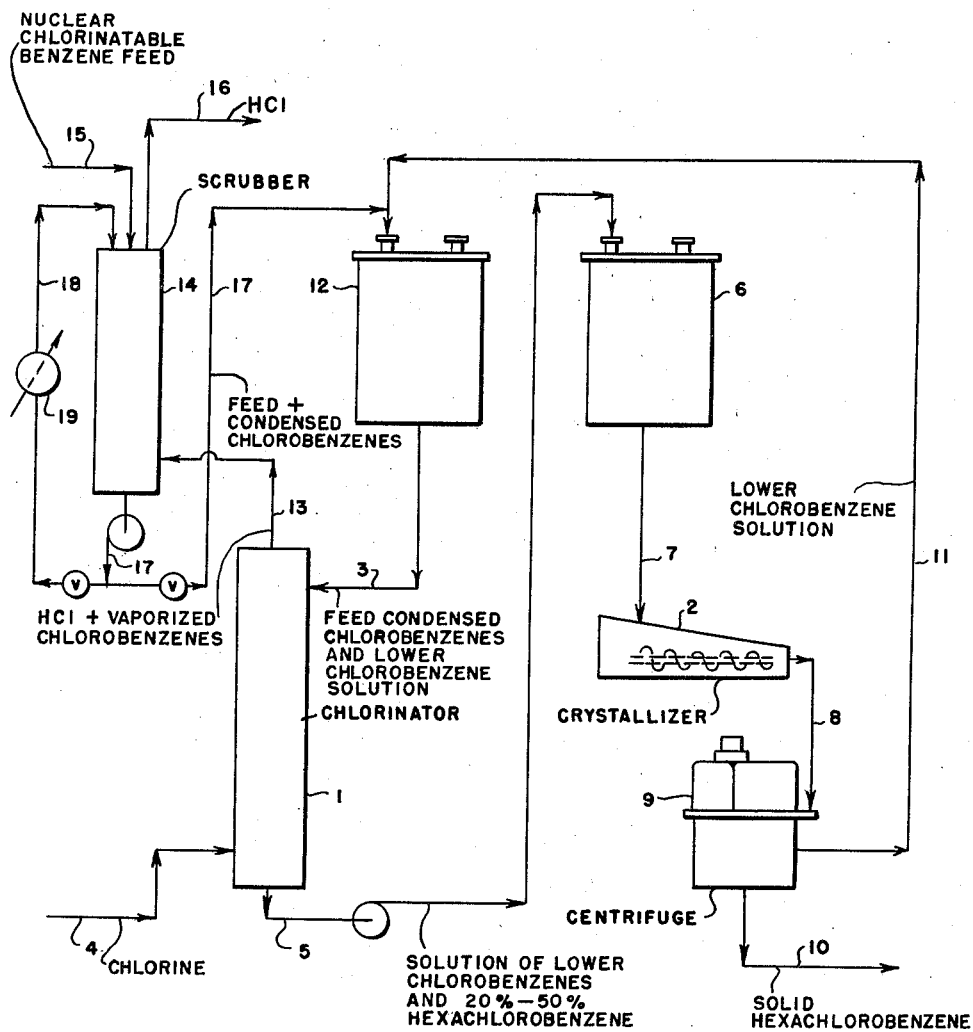

PRODUCTION OF HEXACHLOROBENZENE

Bernard H. Nicolaisen, Lewiston, N. Y., assignor to Olin Mathieson Chemical Corporation, a corporation of Virginia Application February 3, 1953, Serial No. 334,926

1 Claim. (Cl. 260—650)

My invention relates to the production of hexachlorobenzene by nuclear substitution chlorination of benzene and partially nuclear chlorine substituted benzenes.

Benzene and the lower chlorobenzenes can be completely chlorinated to yield hexachlorobenzene by the addition of gaseous chlorine to benzene and chlorobenzenes maintained in the liquid phase at temperatures of about 250° C. and under superatmospheric pressure, employing a conventional nuclear substitution chlorination catalyst, such as iron or ferric chloride. Hexachlorobenzene, however, which melts at 226° C. in the pure state, exhibits a strong tendency to vaporize and collect as the solid in vapor take-off lines and the like. Thus its recovery is rendered extremely tedious, and successful continuous commercial scale operation by the gaseous chlorination technique is effectively prevented. I have found, however, that successful commercial production of hexachlorobenzene may be attained by partial chlorination of benzene and partially nuclear chlorine substituted benzenes followed by partial crystallization of the chlorobenzene solution produced.

Thus, the process of my invention contemplates maintaining a stream of benzene hydrocarbons susceptible to chlorine substitution, such as benzene and partially nuclear chlorine substituted benzenes, and usually containing some hexachlorobenzene, which circulates cyclically between a chlorination zone maintained at approximately atmospheric pressure and at a temperature within the range of 150°–200° C. and a crystallization zone maintained at a minimum temperature of about 100° C. Gaseous chlorine is added to the stream in the chlorination zone in an amount calculated to yield a hexachlorobenzene concentration of about 20%–50% by weight in the stream leaving the chlorination zone. The relatively low temperature in the crystallization zone results in the crystallization of a substantial proportion of the hexachlorobenzene content of the stream which is then separated from the stream. The stream of liquid benzene hydrocarbons separated from the crystallization zone, together with benzene hydrocarbons, i. e., benzene and partially nuclear chlorine substituted benzenes, added to make up the benzene content removed by the crystallization, are returned to the chlorination zone.

A conventional nuclear chlorine substitution catalyst is employed in the chlorination zone. The hydrogen chloride gas released in the chlorination zone is advantageously scrubbed countercurrently with the incoming benzene hydrocarbon stream in order to recover vaporized hydrocarbons contained in the exit gases. The required temperature for the chlorination zone is obtained by any suitable method such as by passing some of the hydrocarbon feed as it leaves the scrubber through a heat exchanger and reintroducing it with the feed entering the scrubber. Separation of the crystallized hexachlorobenzene product is advantageously accomplished by centrifugation.

The chlorination is non-selective, and the circulating stream will assure an equilibrium between various chlorobenzenes, provided the removal of hexachlorobenzene and addition of make-up benzene hydrocarbons is maintained substantially uniform. If the last two factors are not uniform, some variation in the character of the stream must, of course, be expected. It is well-known that gaseous chlorine reacts with benzene and partially nuclear chlorine substituted benzenes, except pentachlorobenzene, under ring substitution conditions, to form not only the next higher chlorinated benzenes but also substantial proportions of even higher chlorobenzenes. Heretofore emphasis has been placed upon obtaining a single product and conditions have been carefully selected to hinder production of other than the desired chlorobenzene. I am aware that partial chlorination of benzene has been suggested in the production of monochlorobenzenes and the like in order to limit the production of extraneous, undesired polychlorobenzenes. My process is particularly to be distinguished from such suggestions in that I deliberately chlorinate to obtain a wide selection of chlorobenzenes including only a limited proportion of the desired hexachlorobenzene product. Ultimately, by successive passes I obtain complete conversion to hexachlorobenzene but always a substantial proportion of at least several lower chlorobenzenes remains present in solution with the hexachlorobenzene.

Hexachlorobenzene is retained in solution at concentrations below about 50% by weight of hexachlorobenzene and does not vaporize or crystallize in the chlorinator and take-off lines. Thus, I contemplate a partial substitution chlorination by the reaction of gaseous chlorine at temperatures within the range of 150°–200° C. and at atmospheric pressure with the liquid benzene hydrocarbons to yield between about 20 weight percent and about 50 weight percent hexachlorobenzene in solution with partially nuclear chlorine substituted benzenes. The minimum temperature is defined by the necessity of maintaining the hexachlorobenzene in solution. Thus at 30–35 weight percent hexachlorobenzene for example, the hexachlorobenzene is completely soluble at about 160° C. The maximum temperature is set not only by the fact that there is no need for a higher temperature to obtain effective chlorination, but also to prevent substantial vaporization or sublimation of the hexachlorobenzene product.

I have also found that solutions of hexachlorobenzene in partially nuclear chlorine substituted benzenes containing about 20%–50% by weight hexachlorobenzene may be crystallized by cooling the solution to a minimum temperature of about 100° C. with recovery of a hexachlorobenzene crystal product of a minimum purity of about 96% or 97% by weight. Lower temperatures result in a rapid decrease in the purity in the hexachlorobenzene product crystallized from the solution. Maximum crystallization temperature is set largely by economic considerations since temperatures approaching the solubility point of the hexachlorobenzene remove relatively small proportions of hexachlorobenzene from solution. Thus I chlorinate at a temperature in the range of 150°–200° C., and preferably in the range of 160°–180° C., to a total hexachlorobenzene concentration of 20 weight percent to about 50 weight percent, and preferably 30 weight percent to about 35 weight percent, and I cool the resultant chlorobenzene stream to a temperature close to the minimum of about 100° C.

In order to realize complete conversion of substantially all benzene hydrocarbons to the hexachlorobenze product, I maintain the stream of the benzene hydrocarbons circulating cyclically between the chlorinating zone and the crystallization zone.

Additional benzene hydrocarbons which are added subsequent to the crystallization step can be benzene or any partially nuclear substituted chlorobenzenes. Thus my process is particularly useful in the recovery of polychlorobenzenes having relatively low market value which are undesired by-products in the production of such compounds as paradichlorobenzene. Another relatively inexpensive source of chlorobenzenes can be obtained by the dehydrochlorination of benzene hexachloride isomers which remain after separation of lindane. I do not limit my process to such chlorobenzenes however since all partially nuclear chlorine substituted benzenes and benzene can be employed when economically feasible.

The drawing illustrates a suitable arrangement of equipment for carrying out the process of my invention.

In the drawing chlorinator 1 and crystallizer 2 are interconnected to provide a stream of reactants circulating cyclically between them. A solution of benzene hydrocarbons susceptible to nuclear chlorine substitution is charged to chlorinator 1 through line 3. The benzene hydrocarbons are contacted with chlorine charged to chlorinator 1 through line 4 and conditions in chlorinator 1 are maintained at approximately atmospheric pressure and at temperatures between 150° and 200° C. A suitable ring chlorination catalyst such as iron or ferric chloride is employed to catalyze the substitution reaction. The amount of chlorine charge is controlled to yield 20% to 50% hexachlorobenzene in the chlorinated product withdrawn from chlorinator 1 through line 5. The product stream is delivered by line 5 to feed tank 6.

Line 7 delivers the chlorinated product from feed tank 6 to crystallizer 2 which is maintained at a relatively low temperature of about 100° C. minimum. A substantial proportion of the hexachlorobenzene content crystallizes out of solution while in crystallizer 2. The chilled solution containing crystals of hexachlorobenzene is then delivered through line 8 to centrifuge 9 which separates the crystals of hexachlorobenzene from the chlorobenzenes remaining in solution. The crystal product is withdrawn and recovered through line 10 while the solution is recycled through line 11 to feed tank 12.

Hydrogen chloride gas evolved in chlorinator 1 contains some vaporized chlorobenzenes which are withdrawn through line 13 with the hydrogen chloride. The gas stream is extracted by scrubber 14 by the countercurrent incoming feed of benzene hydrocarbons introduced to scrubber 14 through line 15. The scrubbed hydrogen chloride gas is drawn off from scrubber 14 through line 16. The benzene hydrocarbon feed, containing most of the chlorobenzenes which were entrained in the hydrogen chloride, is withdrawn from the scrubber through line 17 and passed to feed tank 12. The mixture of the fresh feed and recycled solution in feed tank 12 is then passed to chlorinator 1 through line 3 as described previously. When the amount of benzene hydrocarbon feed introduced through line 15 is insufficient to provide proper scrubbing of the exit gases from chlorinator 1 some of the feed withdrawn through line 17 is advantageously recycled through scrubber 14 by means of line 18 which is suitably provided with heat exchanger 19 to cool the recycled stream and thus provide more efficient recovery of the vaporized hydrocarbons in scrubber 14.

The following examples are typical of the proportions of chlorobenzenes employed in the various streams passing between the equipment described in the drawing.

*Example I*

In this example the feed charged through line 17 to feed tank 12 had the following analysis:

| Benzene hydrocarbon: | Weight percent |
|---|---|
| 1,2,4-trichlorobenzene | 71 |
| 1,2,3-trichlorobenzene | 26 |
| 1,2,4,5-tetrachlorobenzene | 1.5 |
| 1,2,3,4-tetrachlorobenzene | 1.5 |
| | 100 |

Chlorination was carried out at 160° C. with back mixing. The chlorinated product withdrawn from chlorinator 1 had the following analysis:

| Benzene hydrocarbon: | Weight percent |
|---|---|
| 1,2,3,4-tetrachlorobenzene | 16 |
| 1,2,4,5-tetrachlorobenzene | 19 |
| Pentachlorobenzene | 36 |
| Hexachlorobenzene | 29 |
| | 100 |

The chlorinated solution was then cooled to 100° C. with crystals first appearing as the solution reached 145° C. The crystalline product drawn from centrifuge 9 through line 10 had the following analysis:

| Benzene hydrocarbon: | Weight percent |
|---|---|
| Pentachlorobenzene | 3.5 |
| Hexachlorobenzene | 96.5 |
| | 100.0 |

The equilibrium solution withdrawn from centrifuge 9 which was to be recycled through line 11 to feed tank 12 had the following analysis:

| Benzene hydrocarbon: | Weight percent |
|---|---|
| 1,2,3,4-tetrachlorobenzene | 24 |
| 1,2,4,5-tetrachlorobenzene | 26 |
| Pentachlorobenzene | 42 |
| Hexachlorobenzene | 7 |
| | 99 |

*Example II*

In this example the material charged through line 17 has the following analysis:

| Benzene hydrocarbon: | Weight, percent |
|---|---|
| 1,2,4,5-tetrachlorobenzene | 28 |
| 1,2,3,4-tetrachlorobenzene | 72 |
| | 100 |

Chlorination is carried out between 150 and 200° C. by continuous operation, providing a contact time of 2.0 hours between chlorine and the hydrocarbon charged. The chlorinated product withdrawn from chlorinator 1 through line 5 has the following analysis:

| Benzene hydrocarbon: | Weight, percent |
|---|---|
| 1,2,4,5-tetrachlorobenzene | 11 |
| 1,2,3,4-tetrachlorobenzene | 18 |
| Pentachlorobenzene | 37 |
| Hexachlorobenzene | 34 |
| | 100 |

After chilling to 100° C. and centrifugation the hexachlorobenzene product withdrawn through line 10 has the following analysis:

| Benzene hydrocarbon: | Weight, percent |
|---|---|
| Pentachlorobenzene | 3 |
| Hexachlorobenzene | 97 |
| | 100 |

The equilibrium chlorobenzene solution to be recycled of feed tank 12 through line 11 has the following analysis:

| Benzene hydrocarbon: | Weight, percent |
|---|---|
| 1,2,4,5-tetrachlorobenzene | 15 |
| 1,2,3,4-tetrachlorobenzene | 25 |
| Pentachlorobenzene | 51 |
| Hexachlorobenzene | 9 |
| | 100 |

I claim:

A process for the production of hexachlorobenzene by the chlorine substitution of benzene and partially nuclear chlorine substituted benzene which comprises cyclically circulating a stream of benzene hydrocarbons between a chlorination zone maintained at approximately atmospheric pressure and a temperature within the range of 150–200° C. and a crystallization zone maintained at a minimum temperature of 100° C., maintaining in said chlorination zone a catalyst effective to promote nuclear chlorine substitution, introducing gaseous chlorine to said chlorination zone in an amount to yield a hexachlorobenzene concentration of about 20% to about 50% by weight in the stream of chlorinated benzenes withdrawn from the chlorination zone, recovering hexachlorobenzene crystallized in the crystallization zone, and introducing a chlorinatable benezene hydrocarbon selected from the group consisting of benzene and partially nuclear chlorine substituted benzenes to said chlorination zone in admixture with the solution of chlorinated benzenes withdrawn from the crystallization zone after crystallization of hexachlorobenzene.

References Cited in the file of this patent
UNITED STATES PATENTS

| | | |
|---|---|---|
| 1,923,419 | Britton | Aug. 22, 1933 |
| 1,934,675 | Mills | Nov. 7, 1933 |

OTHER REFERENCES

Huntress: "Organic Chlorine Compounds," pages 477–9 (1948).